Sept. 3, 1929.  A. H. G. FOKKER  1,726,981
AIRCRAFT
Filed Feb. 18, 1926   3 Sheets-Sheet 1
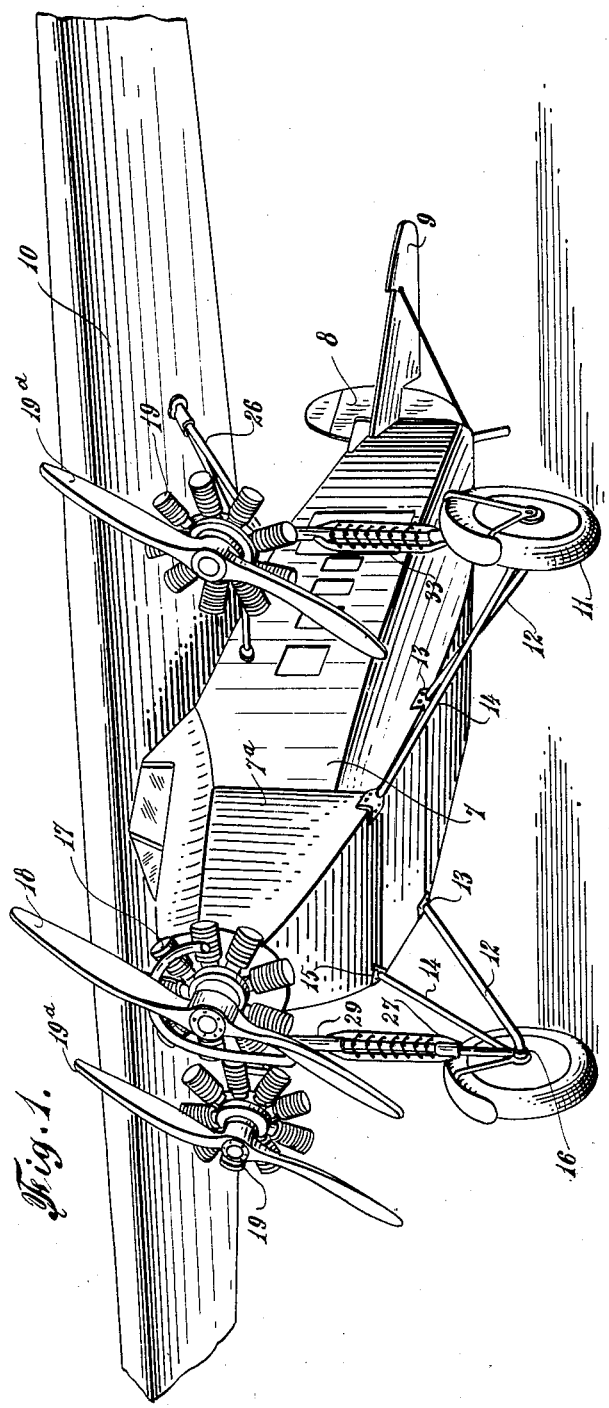
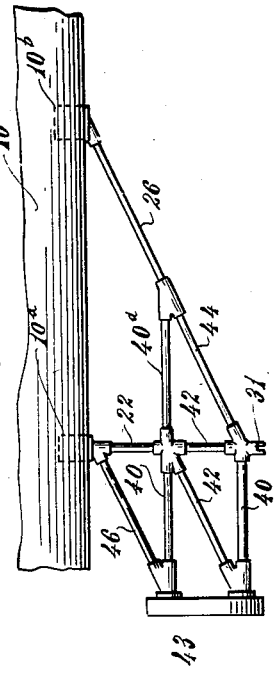
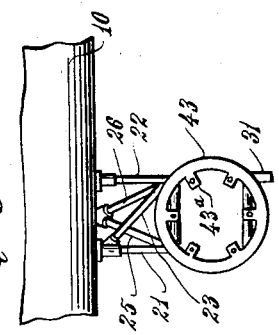
INVENTOR
Anthony H.G. Fokker
BY
ATTORNEY Sept. 3, 1929.  A. H. G. FOKKER  1,726,981
AIRCRAFT
Filed Feb. 18, 1926  3 Sheets-Sheet 2
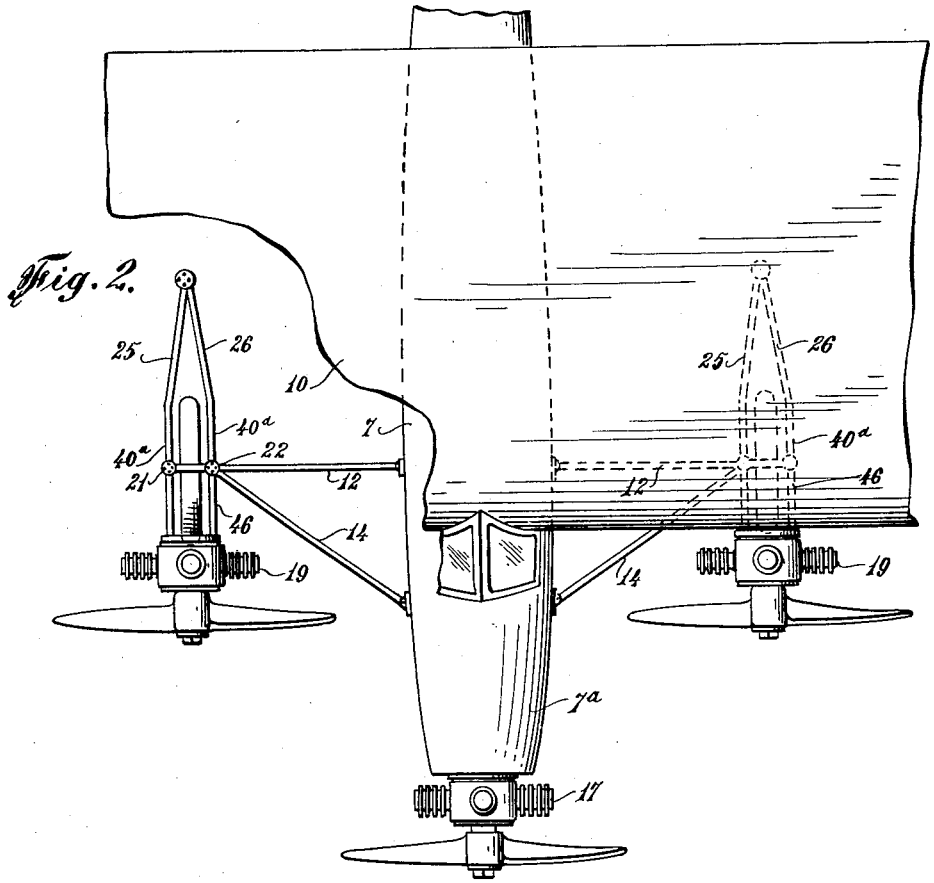
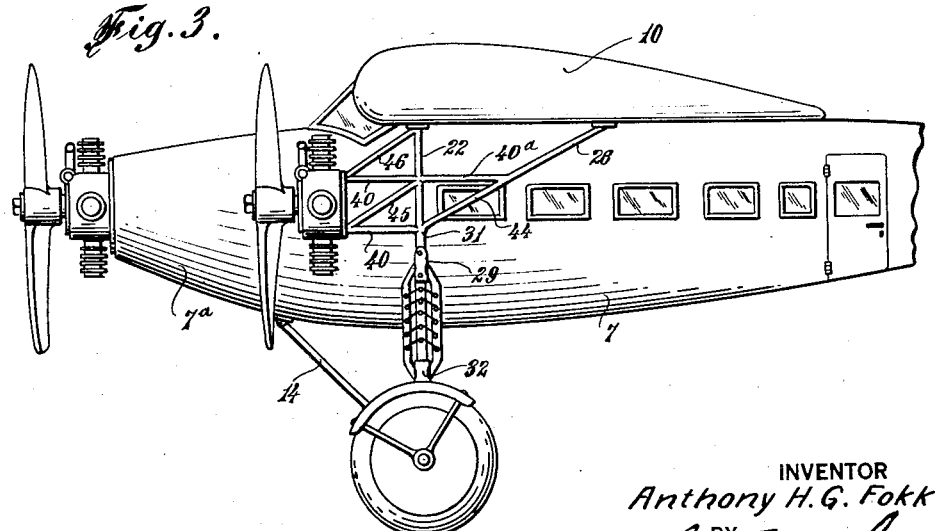
INVENTOR
Anthony H.G. Fokker
BY
ATTORNEY Sept. 3, 1929.   A. H. G. FOKKER   1,726,981
AIRCRAFT
Filed Feb. 18, 1926   3 Sheets-Sheet 3
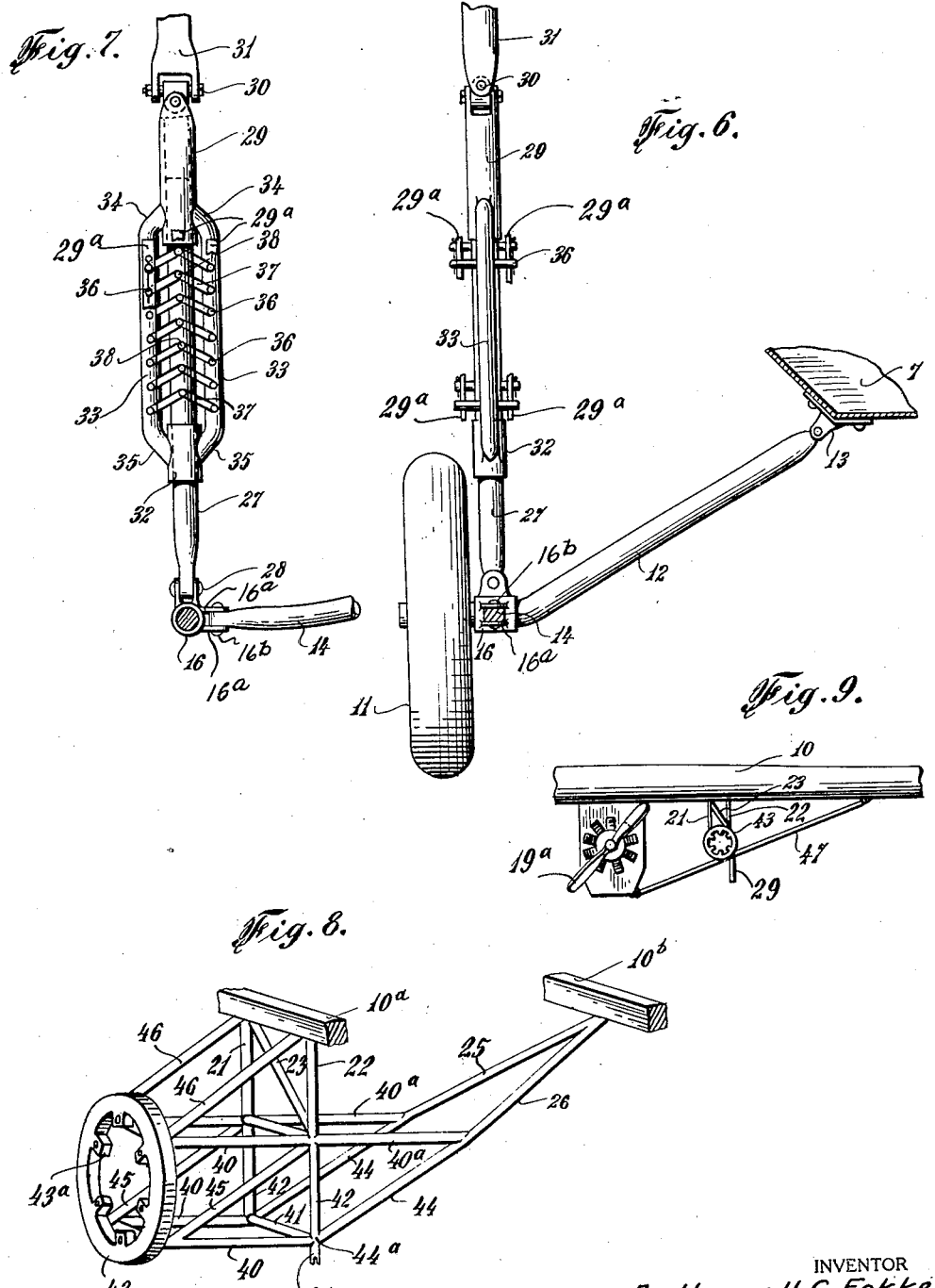
INVENTOR
Anthony H. G. Fokker
ATTORNEY Patented Sept. 3, 1929.

1,726,981

UNITED STATES PATENT OFFICE.

ANTHONY HERMAN GERARD FOKKER, OF AMSTERDAM, NETHERLANDS.

AIRCRAFT.

Application filed February 18, 1926. Serial No. 89,002.

The present invention relates generally to aircraft and is more especially directed to improvements in airplanes of the so-called monoplane type in which the fuselage or body is located or disposed below the upper surface of the wing or supporting surface.

As is well known, it has been the practice to equip airplanes with a single internal combustion engine to provide the power for driving the airscrew or propeller. While these single motor craft possess many advantages, it is nevertheless recognized that safety and reliability in operation are substantially wholly dependent upon the performance of the engine or power plant. Statistics show that a high percentage of airplane accidents are directly due to forced landings made necessary by the failure of the power plant and it follows that greater dependability and safety may be attained by multiplication of the power units. Manifestly, independently functioning power plants will practically eliminate the necessity of forced landings by reason of motor troubles, with the attendant hazards.

While safety is of paramount importance, in commercial services particularly, reliability in maintaining schedules and useful load carrying qualities are also essential. It has been found that to attain these objectives, as well as other advantages in airplane performance, multiplication of the power plants is necessary, and in some instances bi-planes, triplanes and that type of monoplane in which the wing is below the fuselage have been equipped with two or more engines, the structural characteristics of these types of craft rendering them more or less adaptable to such equipment. However, up to the present time no practical and satisfactory method of obtaining the benefits of a plurality of motors in a monoplane of the type in which the fuselage is below the upper surface of the wing has been evolved.

It is well established that the last mentioned type of monoplane possesses many characteristics which make it aerodynamically superior to biplanes and to those monoplanes in which the wing is at the bottom or below the fuselage. For instance, as is well known, it is the upper portion of the wing which contributes the greater lift and with the upper surface above the fuselage, the center section remains unbroken, so that there is a minimum loss in maximum lift and efficiency in a wing of a given design. On the other hand, where the fuselage is placed above the wing, there is no way of maintaining lift at the center portion and aerodynamic results are consequently poor. Further, the so-called high wing type of monoplane affords much better visibility for the pilot and the passengers, than is obtainable with the obstructions that limit the range of forward and downward vision in biplanes and especially in monoplanes of the low wing construction. In fact, it has been demonstrated that monoplanes of the thick wing type, in which the fuselage is substantially below the wing, render the most satisfactory service in meeting the variable and onerous demands of commercial usage.

Recognizing the generally superior qualities of the high wing type of monoplane, or one in which the major part of the fuselage is below the wing, many attempts have been made to attain such further advantages as would flow from the use of a plurality of motors or engines therein. These attempts have been unsuccessful, however, for various reasons, but principally because of the improper placement of the motors carried by the wing.

In the previous efforts to solve the problem, the engines or motors were either mounted above the wing or in the leading edge thereof. When it is considered that an airfoil is extremely sensitive to variations in its form, especially at the leading edge, it will be manifest that any such change or variation in form, which is substantially tantamount to an obstruction, as an engine mounting for instance, will produce a considerable loss in efficiency. With the motors in the leading edge, where they have been most generally located in the abortive efforts to attain the desired end, the loss in efficiency and lift is extremely high. The aerodynamic characteristics of the wing, are not only detrimentally affected locally, that is in the region of the mountings, but throughout its entire span. The same is true when the engines are placed on or above the wing, though in a slightly less degree. Also, with the engines above the wing, or in the leading edge thereof, longitudinal stability and the control of the craft are seriously impaired, due to the disposition of the thrust, relative to the center of gravity.

Another decided disadvantage, structurally, in the location of the engine in the leading edge or on top of the wing, resides in the practical impossibility of taking up the landing shocks of the engines in the chassis. These shocks are transmitted through the wing, resulting in a gradual weakening of the wing structure, the lateral vibrations, against which it is extremely difficult to brace the engines, when in the leading edge and especially when on top of the wing, being particularly detrimental.

From the foregoing, it will be evident that the general object of the present invention is to provide a monoplane of the type in which the fuselage is below or substantially below the wing with a plurality of motors or power plants, and at the same time retain the aerodynamic characteristics and other advantages inherent to that type of craft.

My invention also comprehends a means and method of supporting motors from the wing of a monoplane in which the fuselage is below the wing, whereby the load of the motors will be distributed throughout various cooperating parts of the airplane structure so that the craft as a whole will be of unusual durability in resisting detrimental forces, especially those created or developed in landing.

It is also an object of my invention to locate the wing-carried or outboard motors and their mountings in such a manner that the surfaces of the wing, or wings, especially the upper surface, or surfaces, remain intact, or uninterrupted, thus avoiding detrimental changes in the aerodynamical characteristics of the wing, or wings, such as occur when part of the wing-surface is cut away, or objects, such as motors, or mountings therefor, are attached or fixed directly thereon, instead of through the interposition of a light framework of small bulk and little head resistance, as in my invention.

Another object to which my invention is directed is the provision of a simple and economical method of supporting engines from the wing of a monoplane, as aforesaid, whereby they will be readily accessible for the purpose of making repairs or replacements, the mountings being such that the removal or replacement of a motor may be accomplished expeditiously without in any way affecting the alignment of the wing or the relationship of the associated parts of the airplane structure.

Other objects and advantages flowing from the practicing of my invention will suggest themselves as the description proceeds, and I would have it clearly understood that I reserve unto myself all rights to the full range of equivalents both in structure and in use, to which I am entitled under my invention in its broadest aspect.

While my invention broadly contemplates the utilization of a plurality of motors in a monoplane of the type in which the fuselage is below the wing, for the purposes of the present disclosure I have elected to illustrate and describe a structure as aforesaid, in which three engines are employed, one of said engines being mounted in the nose of the fuselage, while the remaining engines are supported from the wing, one on each side of the fuselage. However, as stated this showing is merely illustrative and is not to be construed as a limitation of my invention to the specific structures or arrangement shown, or to the use of three motors in an airplane of the specific form to which my invention is directed. For example, more than three engines may be used, and they may be located elsewhere on, or in association with the wing or in association with the fuselage without departing from the spirit and scope of my invention; also, the phrase "below the wing" as herein used, in defining the relation of the fuselage to the wing, is employed in a generic sense to include all of those types of monoplanes wherein the wing is at or adjacent to the top of the fuselage, or where a substantial portion of the fuselage is below the upper surface of the wing, as in structures in which the top of the fuselage is in alinement with and conforms to the curvature of the top surface of the wing, or laterally directed extensions thereof on either side of the fuselage.

In the accompanying drawings:

Figure 1 is a view in perspective of a monoplane of the thick-wing type, in which the fuselage is located beneath the wing, showing a preferred method of associating three motors therewith.

Figure 2 is a top plan view of a fragment of the structure shown in Figure 1, in which a part of the wing is broken away to more clearly disclose the mounting of the suspended motors.

Figure 3 is a view in elevation of a part of the side of the monoplane shown in Figure 1.

Figure 4 is an enlarged view in perspective of the nacelle from which a suspended engine is supported, as in the structure shown in Figure 1.

Figure 5 is a front elevation of the structure shown in Figure 4, including a section of the wing.

Figure 6 is an enlarged detail of the undercarriage and cooperating supporting elements shown in Figures 1 and 3 respectively.

Figure 7 is a detail of the structure shown in Figure 6.

Figure 8 is an enlarged view, in perspective, of the engine mounting or nacelle supported from the wing, and Figure 9 shows a strut connecting the wing and fuselage through the engine mounting suspended from the wing.

Referring now to the drawings in detail, in which like characters of reference are employed to designate similar parts in the several views, 7 indicates the fuselage, which may be of any suitable design, the tail-piece carrying the usual rudder 8 and the elevator 9. Mounted upon, or above the fuselage 7, preferably adjacent the forward end thereof, is a wing or supporting surface 10, which may be of a thick cantilever type, this wing or supporting surface embodying the usual so-called lateral control flaps or ailerons.

The undercarriage, in the present showing, embodies the usual wheels 11 mounted on the spindles of the respective axle members 12 which are fastened to the underbody of the fuselage 7 for semi-universal movement, or universal movement, if desired, by hinge or ball and socket joints, as indicated at 13. Suitable bracing or radius tubes 14, similarly joined to the fuselage in advance of the axle members 12 extend downwardly and rearwardly for hinged connection to the fittings 16 carried by the later. In the form of connection shown, the end of a radius tube is compressed or otherwise formed with a bearing surface, and apertured for pivotal movement on the bolt $16^b$ seated in the lugs $16^a$ of said fitting 16.

In accordance with established practice, in the present embodiment of my invention, I mount an engine or motor 17 in or upon the nose $7^a$ of the fuselage which drives the airscrew or tractor 18. The motor shown is of the radial air-cooled type, and any preferred method of supporting it in proper functioning position may be employed.

Located on each side of the fuselage 7 is a motor or engine 19, of a type similar to that mounted in the nose of the fuselage, each of these motors 19, in the present showing being suspended from the wing 10 in the horizontal plane of the intermediate motor 17.

The nacelles or mountings for the aforesaid motors 19 are preferably constructed of metal tubing, although any other suitable form of structure may be used. As shown, the nacelle consists of a frame composed of the horizontally disposed longitudinal and transverse tubular members 40 and 41 connected by the vertical members 42, the forward ends of the members 40 being united, as by welding, to the annular engine bed 43 provided with radial lugs $43^a$ to which the engine is adapted to be bolted. As will be observed, the upper longitudinal frame members 40 are extended beyond the vertical members 42, as shown at $40^a$; these extensions being connected to the upper ends of the tubular, obliquely disposed, parallel frame members 44, which are joined to the interconnected lower horizontal frame members 40 and 41 as indicated at $44^a$. Suitable diagonal braces 45 are fixed to the engine bed 43 and to the jointure of the top horizontal members 40 and 41 with the vertical members 42.

The members of the aforesaid framework may be streamlined, or, if desired, the whole may be covered with a suitable fairing and oil tanks for the motors may be carried thereby. Likewise, each nacelle may be shaped and proportioned to contain the fuel supply for the motor mounted thereon, with such advantages as may flow from a fuel tank in proximity to the motor, and a power plant that is not dependent with others, upon a common source of fuel supply.

Each nacelle or engine mounting is preferably suspended from the front and rear spars of the wing 10, the connection to the front spar $10^a$ being by means of the vertical struts 21 and 22 braced by the diagonal member 23, and the obliquely disposed radius tubes 46, extending from the jointure of the engine bed 43 with the top frame members 40, to the upper ends of said struts. The rear end of the nacelle is supported from the rear spar $10^b$ by the obliquely disposed struts 25 and 26, which are joined to the interconnected ends of the frame members $40^a$ and 44 and converge upwardly for connection with said spar at, or adjacent, their meeting ends.

It will be evident that the jointure of the cooperating members of the structure of the nacelle frame may be effected by any suitable means, such as sockets or other fittings in which the abutting ends or portions of the members are seated and secured, as by welding, the interconnection of these elements, as described, affording a light, durable and rigid structure.

The forward and rear sets of struts may be integral with the frame members 42 and 44 of which they are respectively continuations, or they may be detachably or otherwise connected thereto; also, the framework may be of a triangulated construction, which may embody an engine bed of an outline other than annular, while the aforesaid forward and rear struts may be fastened to other components of the wing structure in lieu of to the spars as set forth.

It will be manifest that, with the motors or engines 19 suspended from the wing 10 and outwardly of the fuselage 7, as described, the load is distributed over a relatively large area of the wing structure, the method of supporting the engines in advance of the nacelle connection to the front spar, among other advantages, preserving the normal center of gravity of the airplane design. Further, the cooperative association of the members of the nacelle structure and the suspension mediums provide an engine mounting which is of a simple construction, facilitates motor repairs and replacements and, at the same time possesses ample strength and rigidity to resist the destructive forces created by the operation of the aircraft. To add to the efficiency and durability of the structure as a whole, means are provided for transmitting the load, under certain conditions, to the undercarriage, these means embodying a connection between each nacelle and the cooperating axle member 12, which includes yieldable elements especially adapted to dissipate or absorb those detrimental forces which are created or developed in landing.

A form of connection which I have found is highly efficient in attaining the objects of my invention, as aforesaid, embodies a tubular member 27 having a hinged or universal connection with the axle fitting 16 at its lower end as shown at 28, which telescopes or reciprocates within a tube 29 connected by a universal, or other joint, 30 to the nacelle or engine mounting, as at 31. Mounted upon the aforesaid tubular member 27, which is reciprocable therein, is a collar 32 which is movable with the tube 29 and connected thereto by the parallel tubular members 33 and the angularly disposed members 34 and 35, the ends of the members 35 being preferably welded to the aforesaid collar 32, while the converging parts 34 are similarly joined to the lower end of the tube 29. Suitably spaced pins extend through the respective members 33, as indicated at 36, to provide supports for windings or loops of rubber cord, or the like, shown at 37, which are passed thereover for engagement with the pins 38 on the intermediate tubular member 27. These loops of elastic material are held in position upon their supporting pins by retainers $29^a$. A retainer $29^a$ is associated with each set of pins and consists of an elongated plate or strip of metal, apertured for registration with the pins over which it is passed for superposing it upon the cord or elastic material, the retainer being held in place by means of cotter pins or a continuous wire passed through suitable holes in the protruding portions of the walls of the pins.

It will be seen from the arrangement set forth, that the detrimetal forces set up by landing shocks or impacts received by the chassis or undercarriage, will be dissipated or absorbed by the yieldable connection between the tubular members 27 and 29, while, on the other hand, the wing-supported load will be yieldably transmitted along a substantially direct line to the landing gear, the interconnected elements of the entire structure cooperating to obtain an extremely high factor of safety and durability.

In mounting the three motors or engines as described, I am enabled to retain in a monoplane of the specific type to which this invention is directed, all of those characteristics which make such planes in many ways dynamically superior to airplanes of other designs, and at the same time avail myself of the numerous advantages accruing from the employment of the additional motors.

The association of the motors 19 with the wing, as described, is such that the lift contributed by the upper surface of the wing remains unimpaired, so that the lift-drift ratio of a monoplane having the fuselage below the wing, to which a plurality of motors are applied in accordance with my invention, is substantially the same as obtains in the identical type of airplane having but a single engine. Further, the maximum power thrust of all three air-screws is obtained, the location of the motors below the lifting surface of the wing, with the propellers having the same angle of approach in a common horizontal plane, insuring longitudinal stability and uniform sensitiveness of the craft in response to elevator control, irrespective of the number of motors in operation.

In actual practice, it has been found that flight may be maintained with one motor in operation, while, with any two of the three functioning, excess power is obtained for climbing or altitude, with substantially a full load, the control of the airplane under these conditions being accomplished with the same ease as when all of the motors are performing. Obviously, with the added motive power, greater efficiency and safety in operation are assured, with a proportionate increase in the capacity for useful load; also, it will be evident that economy in operation may be effected by throttling the motors below their rated horsepower, when all are in operation and where the highest speed is not essential, thus materially prolonging the life of the motors.

The motors may receive their fuel from a common source of supply, such as tanks situated in the wing or elsewhere or each motor may have an independent fuel supply, the operation of the motors being individually controlled. Of course, under certain conditions of operation, the functioning of the motors may be synchronized, any suitable means for attaining these various ends being employed.

In the structure shown in Figure 9, a diagonal strut 47 is employed to reinforce the structure, this strut being connected to or adjacent the bottom of the fuselage and to the front spar $10^a$, inwardly of the wing-tip. The said strut may be continuous and pass through the engine mounting, or fixed thereto, or it may be of sectional construction. Where it is in two parts, each may have a connection with the engine mounting, in which case it is evident that the latter will contribute materially to the strength of the structure. Of course, while I have described a single strut fixed to the front spar, it will be understood that a similar strut may be connected to the fuselage and to the rear spar of the wing, which may, in turn, be reinforced by a suitable connection to a contiguous part of the nacelle, if so desired.

From the foregoing, it will be manifest that by mounting the so-called out board engines beneath the wing, I have overcome, in a practical manner, all of the disadvantages, aerodynamically and structurally, of prior methods of construction, as hereinbefore pointed out. The upper surface of the wing and the leading edge remain uninterrupted, and with the proper disposition of the engines below the wing, the efficiency and lift of the wing are scarcely affected, if at all. Also, by locating the engines beneath the wing, with their relatively low thrust line, the difficulties of control and the dangerous lack of stability which are direct results of the faulty placement of the motors in prior constructions are entirely eliminated. In these prior structures, the high line of thrust of the propellers while the engines are in operation produces a powerful diving couple about the center of gravity, which must be counteracted to maintain trim or balance, by the hard depression of the horizontal stabilizer. Consequently, when the engines are suddenly stopped, the down load on the tail surfaces, which are now without a diving moment to counteract, causes the nose of the airplane to rise, just at that instant when it should be downwardly inclined for the glide, tending to stall the craft with the usual dangerous possibilities. Not only is the stability vastly improved and the control simplified by the present invention, but greatly increased propeller efficiency is attained, due to the fact that with the air screw centers below the wing, they are working in a region where the velocity of the air is retarded by the circulation around the wing.

Another important factor of the present assemblage is the concentration of weight, the load of the engines being substantially directly transmitted to the landing gear, which result cannot be obtained where the engines are above the wing or in the leading edge thereof, as heretofore described. Again, the present disposition of the engines permits of properly bracing them against lateral vibrations, so that such vibrations will not bear upon the wing structure.

While I have described my invention more or less specifically with reference to the showing herein, it is obvious that I would have it understood that my invention may be practiced in other ways, without departing from the spirit and scope thereof, in attaining the objects hereinbefore set forth.

I claim:

1. The combination with a monoplane having a wing, a fuselage below the wing and an undercarriage connected to said fuselage, of a plurality of propelling motors, certain of said motors being supported from the wing and means for transmitting the wing-supported load to said undercarriage under predetermined conditions, said means being yieldable in response to landing impacts and functioning to dissipate the resultant detrimental forces.

2. The combination with an airplane having a fuselage, a wing disposed above the fuselage, an undercarriage and motor mountings carried by said wing, one on each side of the fuselage, a propelling motor supported by each mounting and a connection between each mounting and the undercarriage, said connection including vertically reciprocable members and a device adapted to dissipate detrimental forces created by landing impacts.

3. A supporting element for use in airplane construction, embodying a pair of telescoping members and a yieldable connection therebetween, said connection including protuberances carried by said relatively movable members and elastic devices associated with said protuberances, to control the movement of said members in opposite directions.

4. An engine mounting for airplanes, embodying an engine bed, a supporting frame therefor formed of interconnected tubular members and means forming continuations of certain of said frame members for suspending said mounting from the wing of an airplane.

5. A monoplane having a fuselage below the upper surface of the wing, a landing gear comprising two independent units, each embodying a ground engaging element connected to said fuselage, a motor, having a propeller, located in the fuselage, an engine support located outwardly of each side of the fuselage, each of said engine supports being interposed between and attached to the under surface of the wing and the adjacent landing gear unit, and an independently operating motor having a propeller, carried by each of said supports, the axes of the propellers of said latter motors being in a plane below that of the wing.

6. A monoplane having a fuselage below the upper surface of the wing, a landing gear comprising two independent units, each embodying a ground engaging element, connected to said fuselage, a motor, having a propeller, located in the fuselage, an engine support located outwardly of each side of the fuselage, each of said engine supports being interposed between and attached to the under surface of the wing and the adjacent landing gear unit, and an independently operating motor, having a tractor propeller, connected to each support and disposed in a vertical plane in advance of the wing. the axes of the propellers of said latter motors being in a plane below that of the wing.

7. A monoplane having a fuselage, the major portion of which is below the upper surface of the wing, a landing gear comprising two independent units, each embodying a ground engaging element, connected to said fuselage, a motor, having a propeller, located in the fuselage, an engine support located outwardly of each side of the portion of the fuselage below the wing, each of said engine supports being interposed between and attached to the under surface of the wing and the adjacent landing gear unit, and an independently operating motor, having a propeller, carried by each of said supports, the axes of the propellers of said latter motors being in a plane below that of the wing.

8. A monoplane having a fuselage, the major portion of which is below the upper surface of the wing, a landing gear comprising two independent units, each embodying a ground engaging element, connected to said fuselage, a motor, having a propeller, located in the fuselage, an engine support located outwardly of each side of the portion of the fuselage below the wing, each of said engine supports being interposed between and attached to the under surface of the wing and the adjacent landing gear unit, and an independently operating motor, having a tractor propeller, connected to each support and disposed in a vertical plane in advance of the wing, the axes of the propellers of said latter motors being in a plane below that of the wing.

9. A monoplane having a fuselage and a wing, the effective lifting area of which is located on each side of the fuselage, the upper surface of the wing being above the fuselage, a motor, having a propeller, located in the fuselage, an engine mounting embodying diagonally braced tubular members suspended beneath the lower surface of the wing, on each side of the fuselage and connected to the wing structure, a motor, with a propeller, removably attached to each of said mountings, each of said wing-supported motors being disposed in a vertical plane in advance of the leading edge of the wing, an undercarriage and connections between each of said mountings and an adajcent part of the undercarriage.

10. A monoplane having a fuselage, embodying a cabin, portions of the wing extending beyond the sides of the fuselage, the upper surface of the wing, of which said extensions are components, being above the fuselage, a motor, having a propeler, located in the fuselage, an engine mounting suspended beneath each of said projecting portions of the wing, a motor, having a propeller, fixed to each of said mountings, each of said motors being disposed in a substantially vertical plane in advance of the leading edge of the wing, and means for supporting said airplane from the ground, said means embodying a pair of wheels, each independently connected to the fuselage, and a connection between each of said wheel supports and the adjacent wing-carried engine mounting.

11. A mounting for a radial air-cooled internal combustion engine in air craft construction, comprising interconnected horizontally and vertically disposed members, diagonally disposed reinforcing struts connected to certain of said horizontal and vertical members, and a bed member, to which the engine is adapted to be detachably and non-rotatably secured, forming one end of said mounting.

12. A mounting for supporting a radial air-cooled internal combustion engine from the underside of a wing of an air-plane, and outwardly of the fuselage thereof, comprising interconnected horizontal and vertical tubular members, diagonally disposed reinforcing struts connected to certain of said horizontal and vertical members and an engine bed carried in a vertical plane forming one end of said mounting, to which an engine is adapted to be detachably secured.

13. In combination with a monoplane having a wing and a landing gear, a mounting adapted to support a motor with its propeller axis in a horizontal plane below the horizontal plane of the wing, said mounting comprising interconnected horizontal and vertical members, diagonally disposed bracing members associated with said horizontal and vertical members, an engine bed-forming member supported by said mounting members and means for attaching said mounting to and beneath the wing whereby said engine bed-forming member will be disposed in a position to support the engine carried thereby in a vertical plane in advance of the leading edge of the wing.

14. In combination with a monoplane having a wing and a landing gear, an engine mounting comprising interconnected horizontal and vertical members, diagonal bracing members associated with said horizontal and vertical members, an engine bed-forming device carried by said members, means for attaching said mounting to the underside of the wing structure whereby an engine fixed to said bed-forming device will be disposed in a vertical plane in advance of the leading edge of the wing and means of connection between said mounting and said landing gear, said connection including yielding means.

15. A monoplane having a fuselage, the major portion of which is below the underside of the wing, a plurality of motors, each having a propeller, located outwardly of the sides of the fuselage, means for supporting said motors from the underside of the wing and spaced therefrom to preserve uninterrupted the wing camber, throughout its area, the vertical axis of each of the wing-supported motors being outwardly of the adjacent edge of the wing, an undercarriage, connections between the fuselage and the undercarriage and means independent of said connections and co-acting with the wing structure and the fuselage to counteract the detrimental effects of the outboard wing load, under predetermined conditions.

16. A monoplane having a thick wing, a fuselage, the major part of which is below the upper surface of the wing, a motor, having a propeller, mounted in the nose of the fuselage, a motor, including a propeller, located on each side of the fuselage in spaced relation thereto and to the underside of the wing, a mounting for each of said latter motors, including a bed disposed in a vertical plane, and spaced supporting members extending to the front and rear spars of the wing structure, each motor being detachably connected to its bed to occupy a position in advance of the center of pressure.

17. A monoplane having a fuselage and a wing, the effective lifting area of which is located on each side of the fuselage, the upper surface of the wing being above the fuselage, a motor, having a propeller, located in the fuselage, an engine mounting embodying diagonally braced tubular members suspended beneath the lower surface of the wing, on each side of the fuselage and connected to the wing structure, a motor, with a propeller, removably attached to each of said mountings, each of said wing-supported motors being disposed in a vertical plane in advance of the leading edge of the wing, an undercarriage composed of two independently movable sections, each comprising a wheel, a support therefor hinged to the fuselage, a radius member hinged to said support and to said fuselage and a connection between each undercarriage section and the engine mounting thereabove, said connection including a device adapted to yield in response to landing impacts.

18. A monoplane having a fuselage, embodying a cabin, portions of the wing extending beyond the sides of the fuselage, the upper surface of the wing, of which said extensions are components, being above the fuselage, a motor, having a propeller, located in the fuselage, an engine mounting suspended beneath each of said projecting portions of the wing, a motor, having a propeller, fixed to each of said mountings, each of said motors being disposed in a substantially vertical plane in advance of the leading edge of the wing, and means for supporting said airplane from the ground, said means embodying a pair of wheels, an axle member for each wheel hinged to the fuselage, a radius member connected to said axle member adjacent the wheel and movably attached to the fuselage, and a strut interposed between and connected to each wheel support and the engine mounting thereabove, said strut being capable of longitudinal extension and contraction and means associated with said strut for controlling such longitudinal movement.

ANTHONY H. G. FOKKER.